US008817884B2

(12) United States Patent
Kudana et al.

(10) Patent No.: US 8,817,884 B2
(45) Date of Patent: Aug. 26, 2014

(54) TECHNIQUES FOR PERCEPTUAL ENCODING OF VIDEO FRAMES

(75) Inventors: Arun Shankar Kudana, Bangalore (IN); Ajit Venkat Rao, Bangalore (IN); Soyeb Nagori, Bangalore (IN); Manoj Koul, Bangalore (IN); Zhan Ma, Brooklyn, NY (US); Do-Kyoung Kwon, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 612 days.

(21) Appl. No.: 12/951,035

(22) Filed: Nov. 20, 2010

(65) Prior Publication Data

US 2011/0122942 A1 May 26, 2011

Related U.S. Application Data

(60) Provisional application No. 61/262,960, filed on Nov. 20, 2009.

(51) Int. Cl.
*H04N 7/18* (2006.01)
*H04N 7/26* (2006.01)

(52) U.S. Cl.
CPC ..... *H04N 19/00175* (2013.01); *H04N 19/0003* (2013.01); *H04N 19/00921* (2013.01); *H04N 19/00036* (2013.01); *H04N 19/00296* (2013.01); *H04N 19/00248* (2013.01); *H04N 19/0009* (2013.01); *H04N 19/0026* (2013.01); *H04N 19/00157* (2013.01); *H04N 19/00351* (2013.01); *H04N 19/0089* (2013.01); *H04N 19/00303* (2013.01)
USPC ................. 375/240.24; 375/240.26

(58) Field of Classification Search
CPC . H04N 7/50; H04N 7/26941; H04N 21/2365; H04N 21/4347; H04N 7/26244
USPC ....................................... 375/240.01–240.29
See application file for complete search history.

(56) References Cited

U.S. PATENT DOCUMENTS 6,493,392 B1 * 12/2002 Moon et al. ............... 375/240.27
6,807,366 B1 * 10/2004 Okubo et al. ................ 386/208

(Continued)

OTHER PUBLICATIONS

Antonio Ortega and Kannan Ramchandram, Rate—Distrotion Method for Image and Video Compression, IEEE Signal Processing Magazine, Year Nov. 1998, p. 23-50.

(Continued)

*Primary Examiner* — Andy Rao
(74) *Attorney, Agent, or Firm* — Mima George Abyad; Frederick J. Telecky, Jr.

(57) ABSTRACT

In a video encoder, pixel values of a macro-block are processed to determine an activity measure indicative of the type of content in the macro-block. Several techniques are employed for determining the activity measure of a macro-block. In an embodiment, a default quantization scale for quantizing a macro-block is modified based on the activity measure of the macro-block. In another embodiment, the macro-block is classified into one of multiple classes based on its activity measure. The default quantization scale for quantizing the macro-block is modified based on the classification of the macro-block. In yet another embodiment, an encoding mode to be used for encoding a macro-block is also determined on the basis of the class of the macro-block. Several of the techniques exploit the fact that the human visual system (HVS) has different sensitivities in perceiving a (rendered) macro-block or video frame, depending on the type of macro-block content.

8 Claims, 7 Drawing Sheets

(56) References Cited

U.S. PATENT DOCUMENTS 8,238,435 B2 * 8/2012 Taylor et al. ............... 375/240.2
2007/0274396 A1 * 11/2007 Zhang et al. ............. 375/240.24

OTHER PUBLICATIONS

Sinzobakwira Issa, Abdi Risaq M. Jama and Othman Omar Khalifa, RD-Optimisation analysis for H.264/AVC scalable video coding, (IJCNS) International Journal of Computer and Network Security, vol. 2, No. 4, Year Apr. 2010, p. 1-5.

Xiang Li, Norbert Örtel, Andreas Hutter and André Kaup , Lagrangian Rate-Distortion Optimization for Hybrid Video Coding, Copyright © Siemens AG 2008, p. 1-17.

Linear Discrete Image Transforms, 55:148 Digital Image Processing, Chapter 11, http://www.icaen.uiowa.edu/~dip/LECTURE/LinTransforms.html, Year Dec. 1, 2003, p. 1-20.

Rate Control and Quantization Control, http://www.mpeg.org/MPEG/MSSG/tm5/Ch10/Ch10.html, p. 1-5.

* cited by examiner

TECHNIQUES FOR PERCEPTUAL ENCODING OF VIDEO FRAMES

RELATED APPLICATION(S)

The present application claims the benefit of U.S. provisional application entitled, "MACROBLOCK CLASSIFICATION BASED PERCEPTUAL VIDEO CODING", Ser. No. 61/262,960, filed on Nov. 20, 2009, and is incorporated in its entirety herewith.

BACKGROUND

1. Technical Field

Embodiments of the present disclosure relate generally to video coding, and more specifically to techniques for perceptual encoding of video frames.

2. Related Art

Video frames generally refer to images representing moving pictures or a static scene. Video frames may be generated and displayed at rates (e.g., thirty frames per second) suitable to create the impression of continuity between the video frames to a viewer. Video frames are typically encoded prior to transmission and/or storage. The encoding may include operations such as compression, encryption, quantization, etc. At a receiving or display end, the video frames are decoded to reconstruct the original frames prior to display.

Perceptual encoding or perceptual video coding refers to video encoding techniques that make use of perceptual properties of the human visual system (HVS) in the encoding operations. For example, video frames may contain 'redundancies', in that the HVS does not perceive, or is less sensitive to, some of the details of the video frames. Consequently, details (or characteristics, in general) of a video frame that are deemed to have less perceptual effect (due to lesser sensitivity of the visual system) on the HVS may be treated differently in the encoding operations than details that are deemed to have a relatively greater perceptual effect.

As an example, the sensitivity of the HVS to noise and encoding artifacts in a video frame varies with the amount of 'texture' in the video frame. In general, the human eye is less sensitive to the presence of noise in highly textured regions of a video frame as compared to a same amount of noise in a region of the video frame with less texture. This psycho-visual property of the HVS is known as "Texture Masking". The actual picture signal acts as a masker and masks the quantization artifacts/noise present in the signal to some extent. Different regions within a picture may have different amounts of texture or spatial detail. Coarse quantization (using fewer bits to represent a frame or a macro-block) may be more noticeable in relatively 'flat' regions of a frame than in regions of the frame which have high texture content. Video encoding may be designed to exploit such properties of the HVS in the encoding operations.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

In a video encoder, one of several techniques is employed to determine an activity measure indicative of the type of content in the macro-block. A default quantization scale for quantizing a macro-block is modified based on the activity measure of the macro-block.

In one embodiment, the video encoder forms a re-arranged macro-block from a received macro-block to be encoded. The re-arranged macro-block is formed with an upper half containing pixel values of odd-numbered rows of the macro-block, and a lower half containing pixel values of even-numbered rows of the macro-block. The video encoder computes a statistical measure of pixel values located in each quadrant of the re-arranged macro-block and the macro-block to obtain multiple statistical measures. The statistical measure for a quadrant is computed based on a difference of pixel values from an average value. The video encoder determines a minimum of the multiple statistical measures, the minimum representing an activity measure of the macro-block. The video encoder modulates a quantization scale received for quantizing the macro-block by the minimum.

In another embodiment, the video encoder computes a summation of the absolute values of differences of values of pairs of adjacent pixels of a macro-block in a video frame. The video encoder modulates a quantization scale received for quantizing the macro-block by the summation.

In yet another embodiment, a video encoder computes a discrete cosine transform (DCT) of a portion of a macro-block of a video frame. The video encoder calculates a weighted sum of AC coefficients of the computed DCT, and modulates a quantization scale received for quantizing the macro-block by the weighted sum.

In yet another embodiment, a video encoder performs a high-pass filtering operation on a video frame to obtain a filtered video frame. The video encoder resets to zero, a value of each pixel in the filtered video frame, if the value of the corresponding pixel in the filtered video frame is less than a threshold value. The resetting operation forms a thresholded video frame. The video encoder classifies a macro-block in the thresholded video frame into one of multiples classes on the basis of an activity measure of the macro-block, and modulates a quantization scale received for quantizing the macro-block on the basis of the class of the macro-block.

In yet another embodiment, a video encoder computes a transform for each of multiple N×N blocks in a video frame. The video encoder forms a DC picture containing only DC coefficients of the transforms obtained. The video encoder classifies, into one of multiple classes, macro-blocks in the video frame on the basis of a standard deviation of pixel values of corresponding N×N blocks in the DC picture. The video encoder modulates a quantization scale received for quantizing the macro-block on the basis of the class of the macro-block.

In another embodiment, a video encoder classifies a macro-block in a video frame into one of multiple classes. The video encoder modulates a quantization scale received for quantizing the macro-block on the basis of the class of the macro-block to generate a modulated quantization scale. The video encoder determines an encoding mode for the macro-block on the basis of the class.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Example Device

Figure 1:
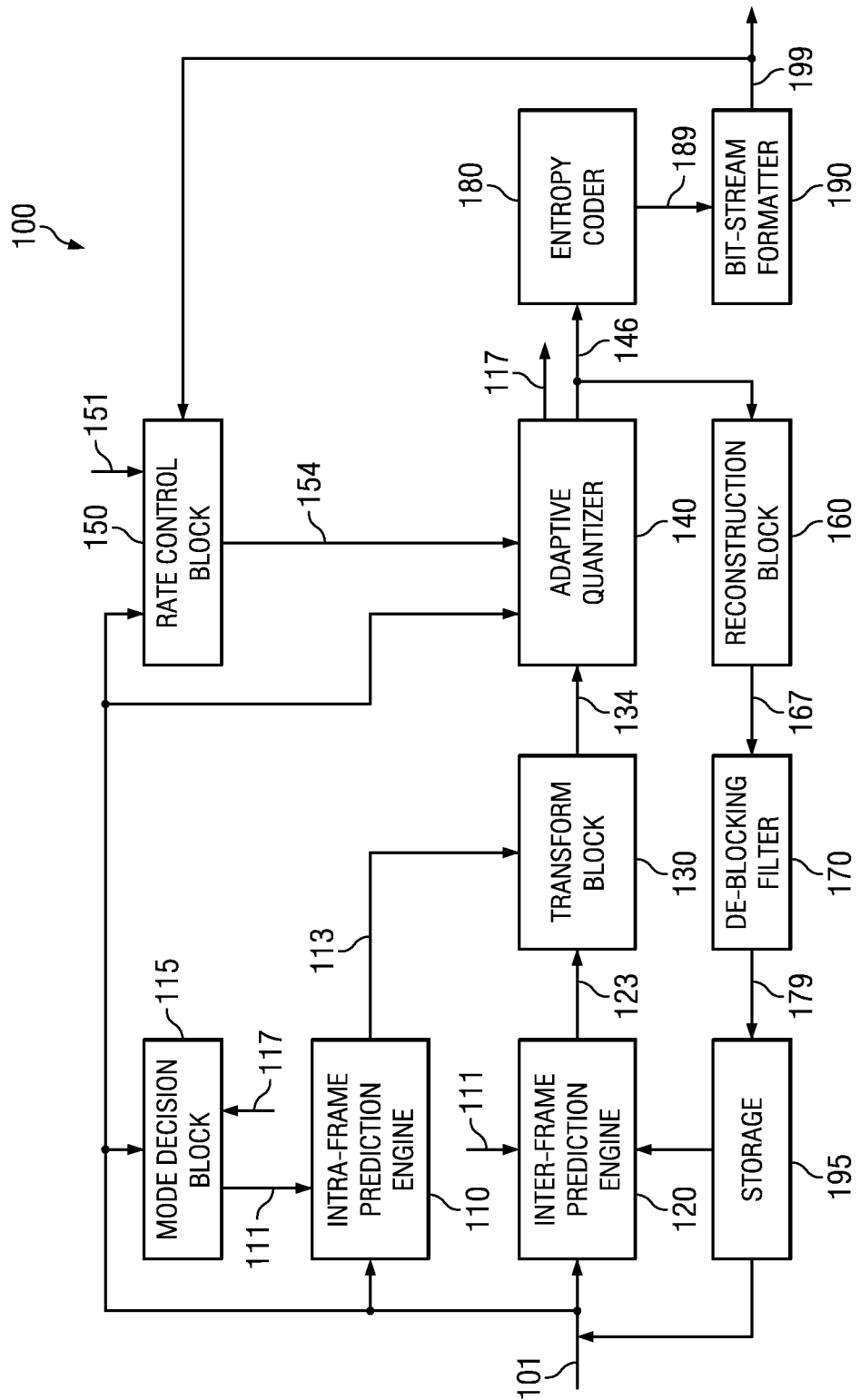
FIG. 1 is a block diagram illustrating the details of an example device in which several embodiments can be implemented.

FIG. 1 is a block diagram illustrating the details of an example device in which several embodiments can be implemented. Video encoder 100 is shown containing intra-frame prediction engine 110, mode decision block 115, inter-frame prediction engine 120, transform block 130, adaptive quantizer 140, rate control block 150, reconstruction block 160, de-blocking filter 170, entropy coder 180, bit-stream formatter 190 and storage 195. The details of video encoder 100 of FIG. 1 are meant to be merely illustrative, and real-world implementation may contain more blocks/components and/or different arrangement of the blocks/components. Video encoder 100 receives source video frames to be encoded on path 101, and generates corresponding encoded frames (in the form of an encoded bit-stream) on path 199. In an embodiment, one or more of the blocks of video encoder 100 may be designed to perform video encoding consistent with standards, such as H.261, H.263, and H.264/AVC.

A video frame received on path 101 may be processed by either intra-frame prediction engine 110 or inter-frame prediction engine 120 or both, depending on whether an intra-coded frame (I-frame), inter-predicted frame (P-frame or B-frame) is to be provided to transform block 130. The specific technique (or combination of techniques) used to encode a video frame is referred to as an "encoding approach". The video frames received on path 101 may be retrieved from a storage device (for example, storage 195 or other storage device(s) connected to path 101, but not shown), and may be in (YCbCr) format. Alternatively, the video frames may be provided in (RGB) format, and converted (YCbCr) format internally in the corresponding blocks (blocks 110 and/or 120) prior to further processing.

Mode decision block 115 receives video frames on path 101 and modulated quantization scales (computed by adaptive quantizer 140, as described below) on path 117. Mode decision block 115 determines an encoding mode to be used to encode macro-blocks of a video frame (received via path 101). Encoding mode refers to the specific set and nature of operations (as well as the corresponding parameters to perform the operations) that are to be performed to encode a macro-block. Thus, mode decision block 115 may determine whether a macro-block (or the video frame itself) is to be encoded using intra-frame prediction (in intra-frame prediction engine 110) or inter-frame prediction (in inter-frame prediction engine 120), which reference frame is to be used for inter-frame prediction, etc. The various modes that may be determined by mode decision block 115 may be consistent with those specified by the H.264/AVC standards or other applicable standards. Mode decision block 115 provides an indication of the encoding mode to intra-frame prediction engine 110 and inter-frame prediction engine 120 via path 111.

Mode decision block 115 may base the specific mode to be used in encoding a macro-block or a video frame on considerations of distortion and transmission bit-rate. Rate-distortion optimization is a technique often used in video encoders to minimize distortion in encoded macro-blocks under a constraint of transmission bit-rate. Mode decision block 115 may base the determination of the mode according to one of several known ways. In an embodiment, mode decision block 115 uses a technique referred to as Lagrangian optimization to determine the mode to be used for encoding macro-blocks or video frames. Lagrangian optimization as might be used in video encoder 100 is described in detail in "Rate-distortion optimization for video compression", IEEE Signal Processing Magazine, November 1998.

For convenience of reference, a frame to be encoded as a P-frame/B-frame (i.e., using inter-frame encoding or using a combination of inter-frame and intra-frame encoding) is itself referred to herein as a P-frame/B-frame, whether prior to encoding or after encoding. Similarly, a frame to be encoded as an I-frame (i.e., using intra-frame encoding only) is referred to herein as I-frame, whether prior to or after encoding. The techniques used for encoding I, P and B frames are also referred to herein as corresponding encoding approaches. The term intra-frame encoding refers to an encoding approach in which macro-blocks of a frame are represented based only on macro-blocks of the same frame, and thus does not use other frames as reference frames. Intra-frame encoding refers to an encoding approach in which macro-blocks of a frame may be represented based on macro-blocks of the same frame and/or other frames termed reference frames.

Intra-frame prediction engine 110 receives video frames on path 101. Assuming a received video frame is to be encoded as an (I) frame, intra-frame prediction engine 110 operates to encode macro-blocks in the received video frame based on other macro-blocks in the same video frame. Intra-frame prediction engine 110 thus uses spatial compression techniques to encode an (I) frame. The specific techniques to encode an (I) frame may be performed consistent with the standard(s) noted above. Accordingly, intra-frame prediction engine 110 may operate to determine correlation between macro-blocks in the video frame. A macro-block determined to have high correlation (identical or near-identical content) with another (reference) macro-block may be represented by identifiers of the reference macro-block, the location of the macro-block in the video frame with respect to the reference macro-block, and the differences (termed residual) between pixel values of the two macro-blocks. Intra-frame prediction engine 110 forwards the compressed representation of a macro-block thus formed on path 113. For macro-blocks that are determined not to have high correlation with any other macro-block in the received video frame, intra-frame prediction engine 110 may forward the entire (uncompressed) macro-block contents (for example, original Y, Cb, Cr pixel values of pixels of the macro-block) on path 113.

Inter-frame prediction engine 120 receives video frames on path 101, and operates to encode the video frames as P-frames or B-frames. Inter-frame prediction engine 120 encodes macro-blocks of a frame to be encoded as a P-frame based on comparison with macro-blocks in a 'reference' frame that occurs earlier than the video frame in display order. Inter-frame prediction engine 120 encodes macro-blocks of a frame to be encoded as a B-frame based on comparison with macro-blocks in a 'reference' frame that occurs earlier, later or both, compared to the video frame in display order.

Inter-frame prediction engine 120 performs correlation between macro-blocks in a 'current' received video frame (on path 101), and macro-blocks in the reference frame (received on path 192) to determine macro-block pairs that are identical or near-identical in content. For matching macro-block pairs, inter-frame prediction engine 120 computes motion vectors representing the displacement between the macro-blocks. In addition, inter-frame prediction engine 120 computes corresponding residuals (differences between pixel values of the matching macro-blocks). Inter-frame prediction engine 120 forwards the motion vectors and the corresponding residuals on path 123. It is noted that a P-frame or a B-frame may also be encoded using a combination of intra-frame and inter-frame prediction, i.e., macro-blocks of P-frames and B-frames may be represented based on macro-blocks of the same frame and/or other frames termed reference frames. Thus, some macro-blocks of a P-frame or B-frame may be encoded by intra-frame prediction engine 110, while others may be encoded by inter-fMme prediction engine 120.

Transform block 130 transforms the residuals received on paths 113 and 123 into a compressed representation, for example, by transforming the information content in the residuals to frequency domain. In an embodiment, the transformation corresponds to a discrete cosine transformation (DCT). Accordingly, transform block 130 generates coefficients representing the magnitudes of the frequency components of residuals received on paths 113 and 123. Transform block 130 also forwards motion vectors (received on paths 113 and 123) to adaptive quantizer 140 via path 134.

Rate control block 150 receives video frames on path 101, and a 'current' transmission bit-rate from path 199, and operates to determine quantization scale(s) (Qs) to be used for quantizing macro-blocks of video frames. It is noted that quantization scale (Qs) is directly proportional to quantization step size. Values of quantization parameters (QP) may be derived from the corresponding Qs values. Rate-control block 150 may also receive data specifying a 'desired' bit-rate to be maintained (for bits transmitted on path 199) via path 151. Rate control block 150 provides the computed quantization scale(s) on path 154.

Adaptive quantizer 140 determines an activity measure for each macro-block of a video frame received on path 101. The activity measure may be representative of the degree of sensitivity of the human visual system to information contained in the macro-block. Accordingly, adaptive quantizer 140 changes the value of a quantization scale received on path 154 on the basis of the activity measure. The change in the value of a quantization scale received on path 154 based on an activity measure of a macro-block is termed herein as modulation. The modulation of the Qs received on path 154 generates a modified Qs (which is also forwarded on path 117), which is then applied by adaptive quantizer 140 to quantize the corresponding macro-block. Thus, adaptive quantizer 140 may divide the values of coefficients corresponding to a macro-block (or macro-block residual) by a modified Qs generated as noted above. Adaptive quantizer 140 forwards the quantized coefficient values and motion vectors on path 146.

Entropy coder 180 receives the quantized coefficients, as well as motion vectors, on path 146, and allocates codewords to the quantized transform coefficients. Entropy coder 180 may allocate codewords based on the frequencies of occurrence of the quantized coefficients. Frequently occurring values of the coefficients are allocated codewords that require fewer bits for their representation, and vice versa. Entropy coder 180 forwards the entropy-coded coefficients on path 189.

Bit-stream formatter 190 receives the compressed, quantized and entropy coded output (referred to as a bit-stream, for convenience) of entropy coder 180, and may include additional information such as headers, information that may be required to enable a decoder to decode the encoded frame, etc., to the bit-stream. Bit-stream formatter 190 may transmit or store locally the formatted bit-stream representing encoded images.

Reconstruction block 160 receives compressed and quantized (in general, encoded) video frames on path 146, and operates to reconstruct the encoded video frames to generate the corresponding source frames. The operations performed by reconstruction block 160 may be the reverse of the operations performed by the combination of blocks 110, 120, 130 and 140, and may be designed to be identical to those performed in a video decoder that operates to decode the encoded frames transmitted on path 199. Reconstruction block 160 forwards frames on path 167 to de-blocking filter 170. The reconstructed frames generated by reconstruction block 160 may be used as reference frames in inter-frame prediction engine 120 for encoding macro-blocks.

De-blocking filter 170 operates to remove visual artifacts that may be present in the reconstructed macro-blocks (of video frames) received on path 167. The artifacts may be introduced in the encoding process due, for example, to the use of different modes of encoding (e.g., I-frame and P-frame). Artifacts may be present, for example, at the boundaries/edges of the received macro-blocks, and de-blocking filter 170 operates to smoothen the edges of the macro-blocks to improve visual quality. De-blocking filter 170 may be implemented consistent with corresponding video coding standards noted above. De-blocking filter 170 forwards the filtered frames on path 179 for storage in storage 195. Storage 195 represents a memory component, and is used to store reconstructed frames.

Figure 2:
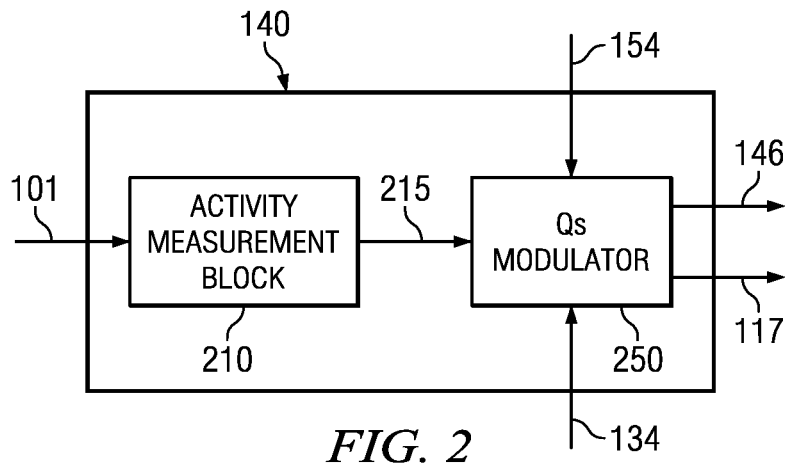
FIG. 2 is a block diagram of an adaptive quantizer of a video encoder, in an embodiment.

As described above, adaptive quantizer 140 determines an activity measure for each macro-block. Subsequently, adaptive quantizer 140 may modulate a Qs received from rate control block based on the activity measure. FIG. 2 is a block diagram of adaptive quantizer 140 in an embodiment. Adaptive quantizer 140 is shown containing activity measurement block 210 and Qs modulator 250.

Activity measurement block 210 receives video frames on path 101, and determines the 'activity' represented in corresponding macro-blocks of the video frame. The term 'activity' herein refers to the extent of variation in the values of pixels contained in a macro-block. Thus, in general, a macro-block with higher 'activity' contains greater variation in its pixel values, and is termed as having more higher-frequency components (in terms of variation in the pixel values) than low-frequency components. On the other hand, a macro-block with lower 'activity' contains lesser variation in its pixel values, and is termed as having more of low-frequency components than high-frequency components. In general, the activity measure is representative of the degree of sensitivity of the human visual system to information contained in the macro-block. Activity measurement block 210 provides as an output, on path 215, an 'activity measure' representing the level of activity of the corresponding macro-block or the whole video frame. In an embodiment, activity measurement block 210 classifies macro-block on the basis of the corresponding activity measures into one of 'smooth', 'edge' and 'texture' macro-blocks. The specific manner in which activity measurement block 210 computes the activity measure is described below with examples.

Qs modulator 250 receives an activity measure on path 215, transformed residuals (coefficients generated by the transform in transform block 130) to be quantized on path 134 and a corresponding Qs value (termed baseQs for convenience) on path 154. Qs modulator 250 changes (modulates) the value of baseQs on the basis of the activity measure to generate a modulated quantization scale. Qs modulator 250 quantizes the transformed residuals using the modulated quantization scale, and also forwards the quantization scale on path 117.

The specific manner in which Qs modulator 250 modulates the value of baseQs is described below with examples. The modulation performed by adaptive quantizer 140 may be either 'continuous' or 'discrete', as also illustrated below.

Several techniques for measuring 'activity' of an original macro-block and modulating baseQs are described next. The techniques are described with reference to corresponding flow diagrams. Each of the flow diagrams below is described with respect to video encoder 100 of FIG. 1, and specifically in relation to one or more of the blocks in video encoder 100, merely for illustration. However, various features described herein can be implemented in other devices and/or environments and using other components, as will be apparent to one skilled in the relevant arts by reading the disclosure provided herein. Further, the steps in the flow diagrams are described in a specific sequence merely for illustration. Alternative embodiments using a different sequence of steps can also be implemented without departing from the scope and spirit of several aspects of the present disclosure, as will be apparent to one skilled in the relevant arts by reading the disclosure provided herein.

Figure 3A:
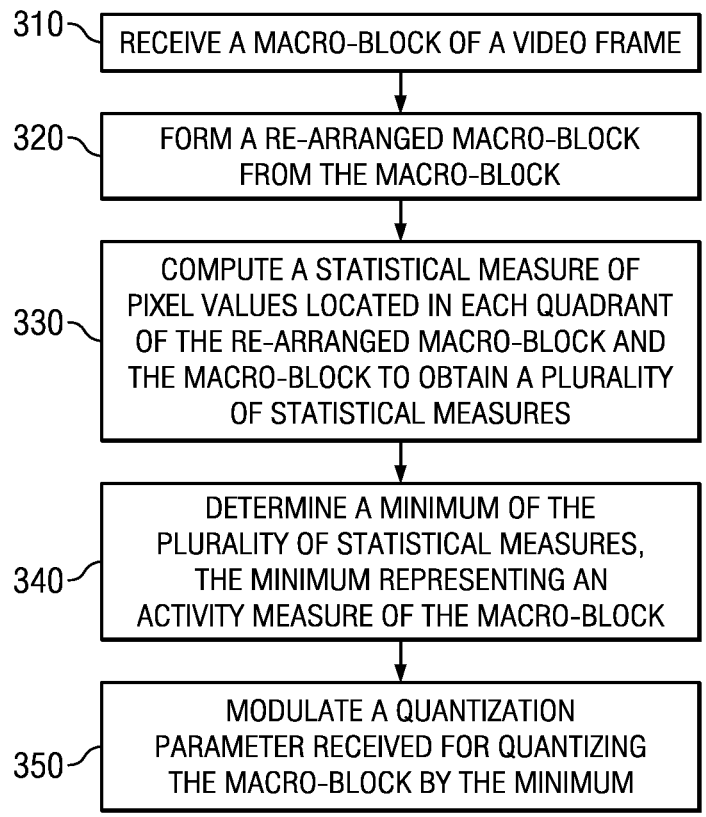
FIG. 3A is a flow diagram illustrating the manner in which adaptive quantization is performed in a video encoder, in an embodiment.

FIG. 3A is a flow diagram illustrating the manner in which a quantization scale (baseQs of above) is modulated in an embodiment.

In step 310, activity measurement block 210 receives a macro-block of a video frame. Control then passes to 320.

Figure 3B:
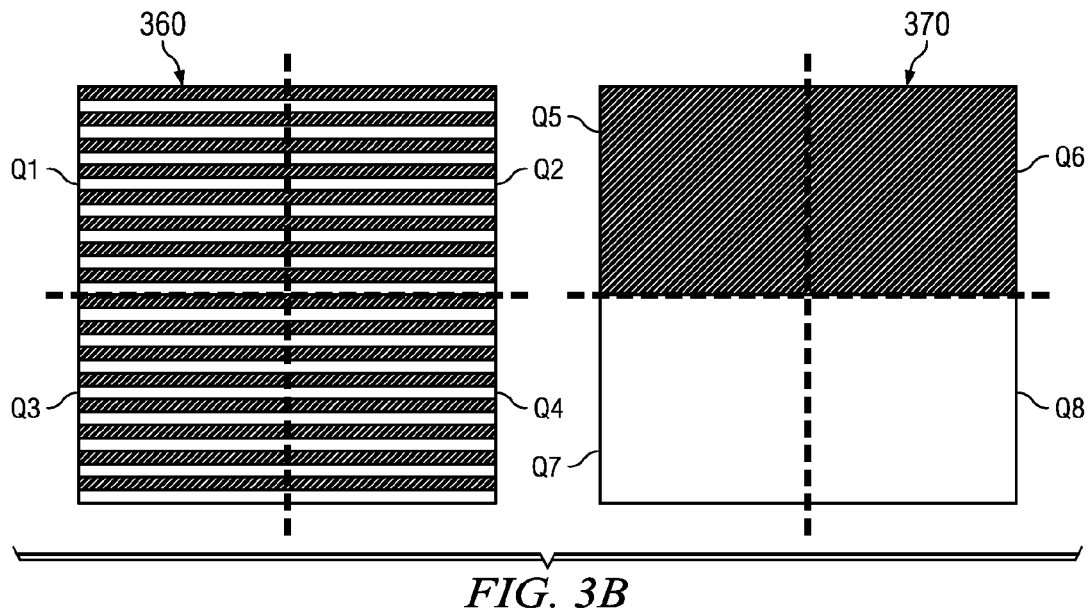
FIG. 3B is a diagram used to illustrate the manner in which a re-arranged macro-block is formed from a macro-block.

In step 320, activity measurement block 210 forms a re-arranged macro-block from the received macro-block. The received macro-block may be viewed as an 'original' macro-block to distinguish it from the re-arranged macro-block. The re-arranged macro-block is obtained by copying odd-numbered rows of the macro-block to the upper half of the re-arranged macro-block, and copying even-numbered rows of the macro-block to the lower half of the re-arranged macro-block. FIG. 3B shows an 'original' macro-block 360 and a re-arranged macro-block 370 obtained from macro-block 360 in the manner noted above. Black lines in macro-block 360 represent odd-numbered rows and white lines the even-numbered rows of macro-block 360. Control then passes to step 330.

In step 330, activity measurement block 210 computes a statistical measure of pixel values located in each quadrant of the re-arranged macro-block and the (original) macro-block. Since there are four quadrants in each of the original and the re-arranged macro-blocks, activity measurement block 210 computes eight statistical measures. In FIG. 3B, Q1 through Q8 represent the eight quadrants. Activity measurement block 210 computes the statistical measure for each quadrant based on differences of pixel values in the quadrant from the average of the pixel values in the quadrant. Control then passes to step 340.

In step 340, activity measurement block 210 determines the minimum of the eight statistical measures. The minimum, thus obtained, represents an activity measure of the macro-block. Control then passes to step 350.

In step 350, Qs modulator 250 modulates a quantization scale received for quantizing the macro-block (i.e., a baseQs received on path 154) by the minimum (computed in step 340) received from activity measurement block 210 and computed in step 340.

In an embodiment, activity measurement block 210 computes the statistical measures of step 330 according to the following equation:

$$SM = \sum_i (\text{abs}[p(i) - avg]) \qquad \text{Equation 1}$$

wherein,
SM is the statistical measure,
i is an index for pixels in a quadrant,
abs is an absolute value operator,
p(i) represents the value of the $i^{th}$ pixel,
avg represents the average value of the i pixels in the corresponding quadrant, and $$\sum_i$$

represents a summation over all values of i.

While the (original) macro-block and the re-arranged macro-block are noted above as being divided into four quadrants each (i.e., 8×8 pixel blocks), in general, other sizes for the blocks such as 4×4, 4×8, 8×4, 8×16, 16×8, etc., can instead be also used, and such blocks are in general referred to as sub-blocks of a macro-block. In such cases, SM of equation 1 would be computed instead for such other sizes.

In an embodiment, the modulation of step 350 is performed according to the following equation:

$$Qs\text{modulated} = \text{base}Qs * [((k*\text{min}SM) + \text{avg}actprev) / ((k*\text{avg}actprev) + \text{min}SM)] \qquad \text{Equation 2}$$

wherein,
minSM is the minimum of the SMs of all blocks,
Qsmodulated is the modulated quantization scale,
baseQs is the quantization scale as provided by rate control block 150, k is a constant determined empirically, and avgactprev is the average value of all the minimum activity measures (SMs) of sub-blocks (such as a quadrant) of macro-blocks of an immediately previously encoded video frame in the sequence.

Figure 4:
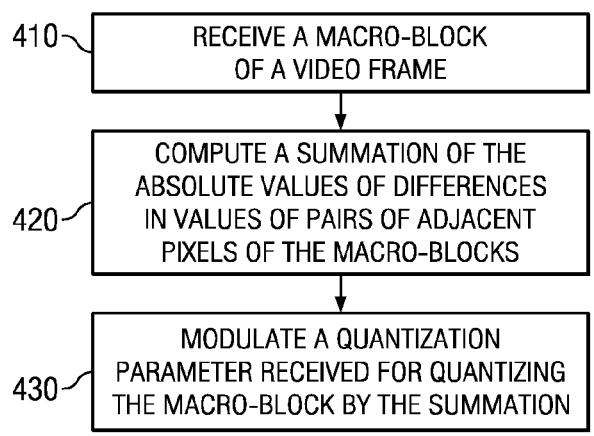
FIG. 4 is a flow diagram illustrating the manner in which adaptive quantization is performed in a video encoder, in another embodiment.

FIG. 4 is a flow diagram illustrating the manner in which a quantization scale (baseQs) is modulated in another embodiment.

In step 410, activity measurement block 210 receives a macro-block of a video frame. Control then passes to step 420.

In step 420, activity measurement block 210 computes a summation of the absolute values of differences of values of pairs of adjacent pixels of the macro-blocks. The pairs of adjacent pixels may include adjacent pixel-pairs in the horizontal, vertical and diagonal directions of the macro-block, a row of the macro-block being in the horizontal direction. The summation (sum) obtained in this step is the activity measure of the corresponding macro-block. In general, larger the value of the summation as computed by step 420, larger is the 'degree' of texture content in the macro-block, and vice versa. Control then passes to step 430.

In step 430, Qs modulator 250 modulates a quantization scale received for quantizing the macro-block by the summation, i.e., baseQs is changed based on the value of the summation of the absolute values of differences obtained in step 420. In an embodiment, the modulation may be performed according to equation 2, provided above.

Figure 5:
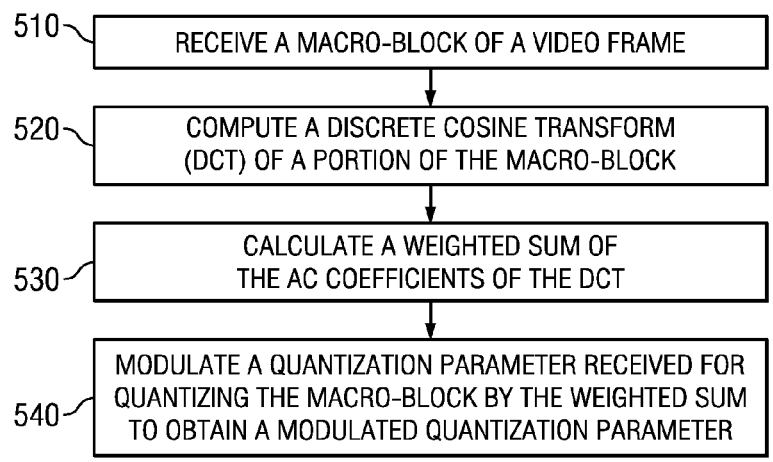
FIG. 5 is a flow diagram illustrating the manner in which adaptive quantization is performed in a video encoder, in yet another embodiment.

FIG. 5 is a flow diagram illustrating the manner in which a quantization scale (baseQs of above) is modulated in yet another embodiment.

In step 510, activity measurement block 210 receives a macro-block of a video frame. Control then passes to step 520.

In step 520, activity measurement block 210 computes a discrete cosine transform (DCT) of a portion of the macro-block. In an embodiment, the portion is an 8×8 section of the macro-block (which is typically a 16×16 pixel block). However, in other embodiments, different sizes for the portion on which a DCT is computed may be used. For example, the DCT may be computed on the entire macro-block itself. The DCT computation generates multiple AC coefficients and a DC coefficient, as is well known in the relevant arts. Control then passes to step 530.

In step 530, activity measurement block 210 calculates a weighted sum of the multiple AC coefficients. In an embodiment, each of the AC coefficients is multiplied by a weighing factor, each of the weighted AC coefficients is squared, and a sum of the weighted and squared AC coefficients is obtained. Control then passes to step 540.

In step 540, Qs modulator 250 modulates a quantization scale received for quantizing the macro-block by the sum to obtain a modulated quantization scale. In an embodiment, the modulation may be performed according to equation 2, provided above.

As may be appreciated, the value of an AC coefficient represents an extent of variations in pixel values in the macro-block, thereby also indicating greater texture content. Larger the value of the AC coefficient, larger the variation. Further, larger the values of higher-frequency AC coefficients, larger still are the variations in pixel values. In an embodiment, AC coefficients representing higher frequencies are weighted more heavily than AC coefficients representing smaller frequencies.

The modulated quantization scale obtained by the application of equation 2, may be further modified based on the value of the DC coefficient of the DCT computed by step 520. As is well known, the DC coefficient is representative of the intensity (and thus brightness) of the portion of the macro-block. Generally, the HVS is less sensitive to changes in intensity (or brightness) at higher intensity ranges than lower intensity ranges. Therefore, in an embodiment, the macro-block containing the portion is quantized with a larger quantization scale value if the DC coefficient of the portion is higher, and vice versa. Hence, the quantization scale value as obtained by application of Equation 2 is further increased if the DC coefficient is higher than a threshold.

In an embodiment, 'N' predefined brightness thresholds are used. The N thresholds are logarithmically spaced. The N predefined thresholds 'create' (N+1) 'sorting buckets'. Each macro-block (or a portion thereof, as noted above) is then sorted into one of the N+1 buckets based on its determined intensity (as indicated by the corresponding DC coefficient). Each of the (N+1) buckets may be assigned a corresponding one of a predetermined quantization scale value. The corresponding one of the predetermined quantization scale value may then be used to quantize the macro-block or portion thereof.

In the techniques described above with respect to the flow diagrams of FIGS. 3A, 4 and 5, the quantization scale value is modulated in a 'continuous' manner, i.e., higher the activity measure of a macro-block, higher is the change in QP by the modulation operation, and vice versa.

In other embodiments of the present disclosure, macro-blocks of a video frame are initially classified into one of multiple macro-block 'types', and the modulation of the baseQs is done on the basis of the specific 'class' that a macro-block is classified as. In an embodiment, macro-blocks are classified as one of a 'smooth', 'edge' and texture macro-blocks.

Figure 6:
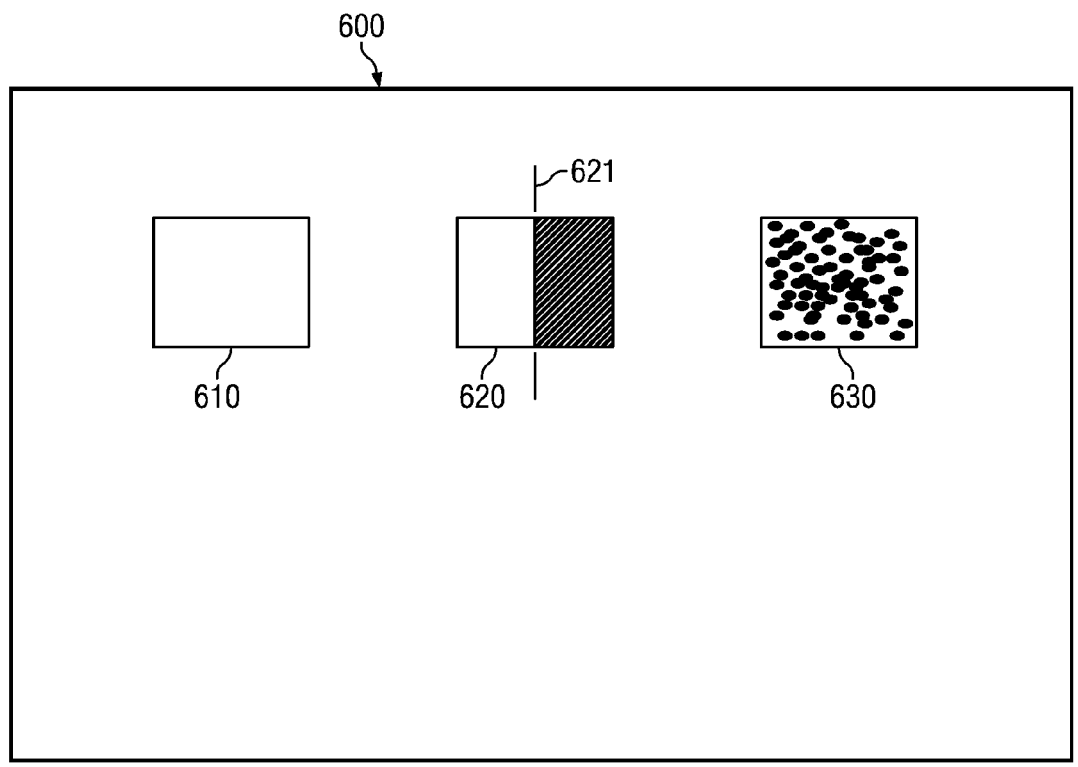
FIG. 6 is an example diagram illustrating three types of macro-blocks.

FIG. 6 shows three example macro-blocks 610, 620 and 630 contained in a video frame 600. It may be observed that there are very few or no variations in pixel values in macro-block 610. Such macro-blocks may be termed smooth macro-blocks. Macro-block 620 contains a sharp edge (621), and such macro-blocks (macro-blocks containing edges) may be termed 'edge' macro-blocks. Macro-block 630 contains a large extent of variations in pixel values, and such or similar macro-blocks may be termed 'texture' macro-blocks. The example macro-blocks of FIG. 6 are meant merely to illustrate the terms smooth, edge and texture. Specific classification as smooth, edge or texture macro-blocks may be performed based on computations, as described herein.

Figure 7:
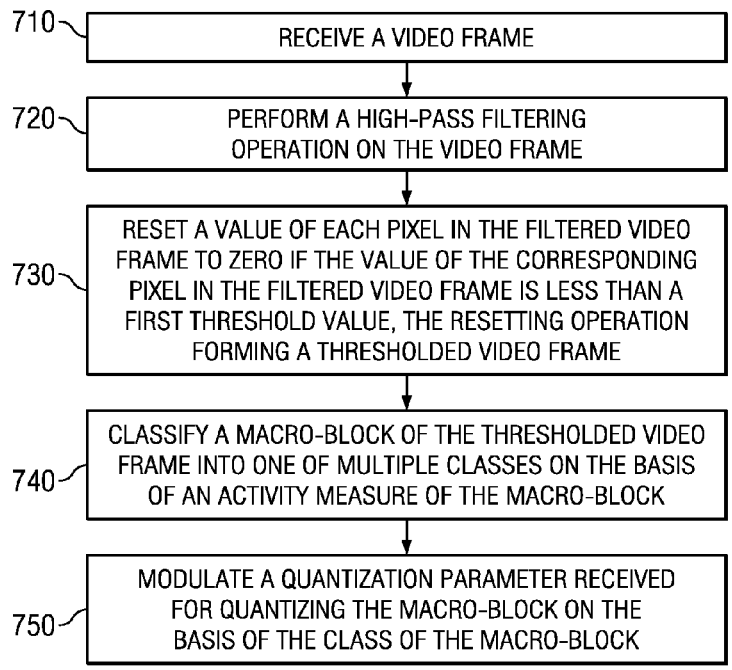
FIG. 7 is a flow diagram illustrating the manner in which adaptive quantization is performed in a video encoder based on classification of macro-blocks, in an embodiment.

FIG. 7 is a flow diagram illustrating the manner in which a macro-block is classified, and a corresponding quantization scale (baseQs of above) is modulated in an embodiment.

In step 710, activity measurement block 210 receives a video frame. Control then passes to step 720.

In step 720, activity measurement block 210 performs a high-pass filtering operation on the video frame to obtain a filtered video frame. In an embodiment, the high-pass filtering is performed using a 3×3 filter kernel $[H_{HP}]$, with coefficients as provided below:

$$H_{HP} = \frac{1}{8}\begin{bmatrix} -1 & -1 & -1 \\ -1 & 8 & -1 \\ -1 & -1 & -1 \end{bmatrix}$$

Control then passes to step 730.

In step 730, activity measurement block 210 resets to zero, values of pixels in the filtered video frame that are less than a first threshold value. The resetting operation generates a thresholded video frame. The first threshold value may be chosen empirically. Control then passes to 740.

In step 740, activity measurement block 210 classifies macro-blocks of the thresholded video frame into one of multiples classes on the basis of an activity measure of the macro-block. The manner in which the activity measure of a macro-block is determined is described below. Control then passes to step 750.

In step 750, Qs modulator 250 modulates a quantization scale received for quantizing the macro-block on the basis of the class of the macro-block.

In an embodiment, activity measure of a macro-block in the thresholded video frame is determined based on the number of pixels with non-zero values in the macro-block. The largest number of non-zero pixels (maxAct) in a macro-block of the thresholded video frame and the least number of non-zero pixels (minAct) in a macro-block of the thresholded video frame are determined. A threshold value TH1 is then computed according to the following equation:

$$TH1 = (maxAct - minAct)*CF + minAct \qquad \text{Equation 3}$$

wherein, CF is a control factor that is empirically determined, and equals 0.2 in an embodiment.

The number of non-zero pixel values in each macro-block in the thresholded video frame is compared with the threshold TH1. If the number of non-zero pixel values in a macro-block is less than TH1, then the macro-block is classified as a 'smooth' macro-block.

If the number of non-zero pixel values in the macro-block is greater than TH1, and if the all macro-blocks adjacent to the macro-block are determined to be smooth macro-blocks, then the macro-block is classified as an 'edge' macro-block. If a macro-block is not classifiable as a smooth macro-block or an edge macro-block, the macro-block is classified as a 'texture' macro-block.

Having thus classified a macro-block in a video frame as one of smooth, edge and texture macro-blocks, activity measurement block 210 provides such information to Qs modulator 250. Qs modulator 250 modulates baseQs received for a macro-block based on whether the macro-block is a smooth, edge or texture macro-block.

The modulation of baseQs may be performed in one of several ways. In one embodiment, baseQs of a macro-block is multiplied by a scaling factor, the specific value of the scaling factor being based on the macro-block class (i.e., whether the macro-block is a smooth, edge or tecture macro-block). If a macro-block is a smooth macro-block, the baseQs received for the smooth macro-block is modulated according to the following equation:

$$Qs\_s = \eta s * baseQs \qquad \text{Equation 4}$$

wherein, Qs_s is the modulated quantization scale for the smooth macro-block, baseQs is the (original) quantization scale (as received from rate control block 150), ηs the scaling factor for smooth macro-blocks.

The corresponding quantization parameter (modulated quantization parameter qps) for smooth macro-blocks is determined from Qs_s, based on the well-known relationship between quantization parameter and quantization scale.

If a macro-block is an edge macro-block, the baseQs received for the edge macro-block is modulated according to the following equation:

$$Qs\_e = \eta e * baseQs \qquad \text{Equation 5}$$

wherein, Qs_e is the modulated quantization scale, baseQs is the (original) quantization scale (as received from rate control block 150), ηe is the scaling factor for edge macro-blocks.

The corresponding quantization parameter (modulated quantization parameter qpe) for edge macro-blocks is determined from Qs_e, based on the well-known relationship between quantization parameter and quantization scale.

If a macro-block is a texture macro-block, the baseQs received for the texture macro-block is modulated according to the following equation:

$$Qs\_t = \eta t * baseQs \qquad \text{Equation 6}$$

wherein, Qs_t is the modulated quantization scale, baseQs is the (original) quantization scale (as received from rate control block 150), ηt is the scaling factor for texture macro-blocks.

The corresponding quantization parameter (modulated quantization parameter qpt) for texture macro-blocks is determined from Qs_t, based on the well-known relationship between quantization parameter and quantization scale.

In an embodiment, values of scaling factors ηs, ηe and ηt respectively equal 0.5, 1 and 2. However, in other embodiments, other values for the scaling factors may be used.

Figure 8:
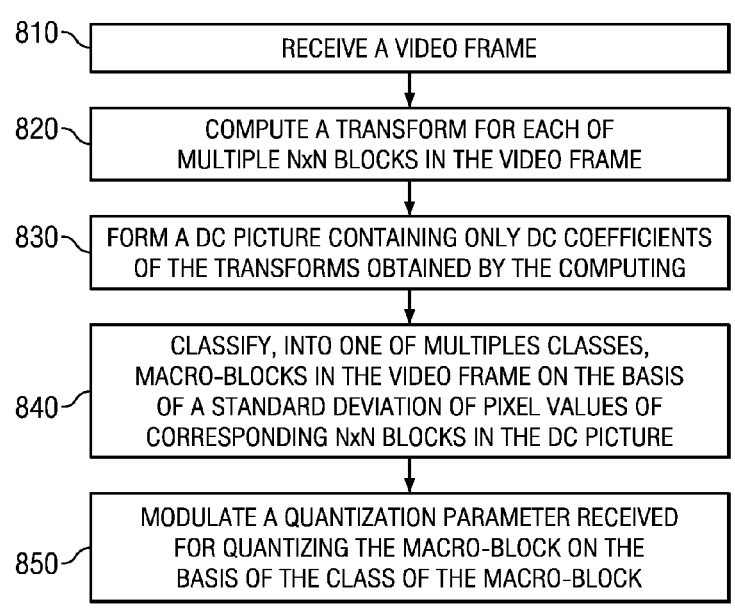
FIG. 8 is a flow diagram illustrating the manner in which adaptive quantization is performed in a video encoder based on classification of macro-blocks, in an alternative embodiment.

FIG. 8 is a flow diagram illustrating the manner in which a macro-block is classified, and a corresponding quantization scale (baseQs of above) is modulated in yet another embodiment.

In step 810, activity measurement block 210 receives a video frame. Control then passes to step 820.

In step 820, activity measurement block 210 computes a transform for each of multiple N×N blocks in the video frame. The value of N is typically chosen as 2 or 4, although other values of N can be used as well. In an embodiment, the value of N equals four. Control then passes to step 830.

In step 830, activity measurement block 210 forms a "DC picture", the DC picture being formed from only the DC coefficients of the transforms obtained in step 820. The DC picture thus obtained has a size that is 1/N of the video frame. A one-to-one correspondence exists between each N×N block in the DC picture and a macro-block in the video frame, as described below with reference to FIG. 9. Control then passes to step 840.

In step 840, activity measurement block 210 classifies into one of multiples classes, macro-blocks in the video frame on the basis of a standard deviation of pixel values of corresponding N×N blocks in the DC picture. Control then passes to step 850.

In step 850, Qs modulator 250 modulates a quantization scale received for quantizing a macro-block on the basis of the class of the macro-block.

In an embodiment, the transform computed in step 820 is the Hadamard transform, and the 4×4 Hadamard matrix is used in computing the Hadamard transform.

The Hadamard transform for each 4×4 block in the video frame is computed according to the following equation:

$$T_{4 \times 4} = H \times I_{4 \times 4} \times H' \qquad \text{Equation 7}$$

wherein, $T_{4 \times 4}$ is the Hadamard transform of a 4×4 block, $I_{4 \times 4}$ is a 4×4 matrix containing pixel values of the 4×4 block, H and H' (transpose of H) are respectively the horizontal and vertical 4×4 Hadamard matrix, and $$H = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Figure 9:
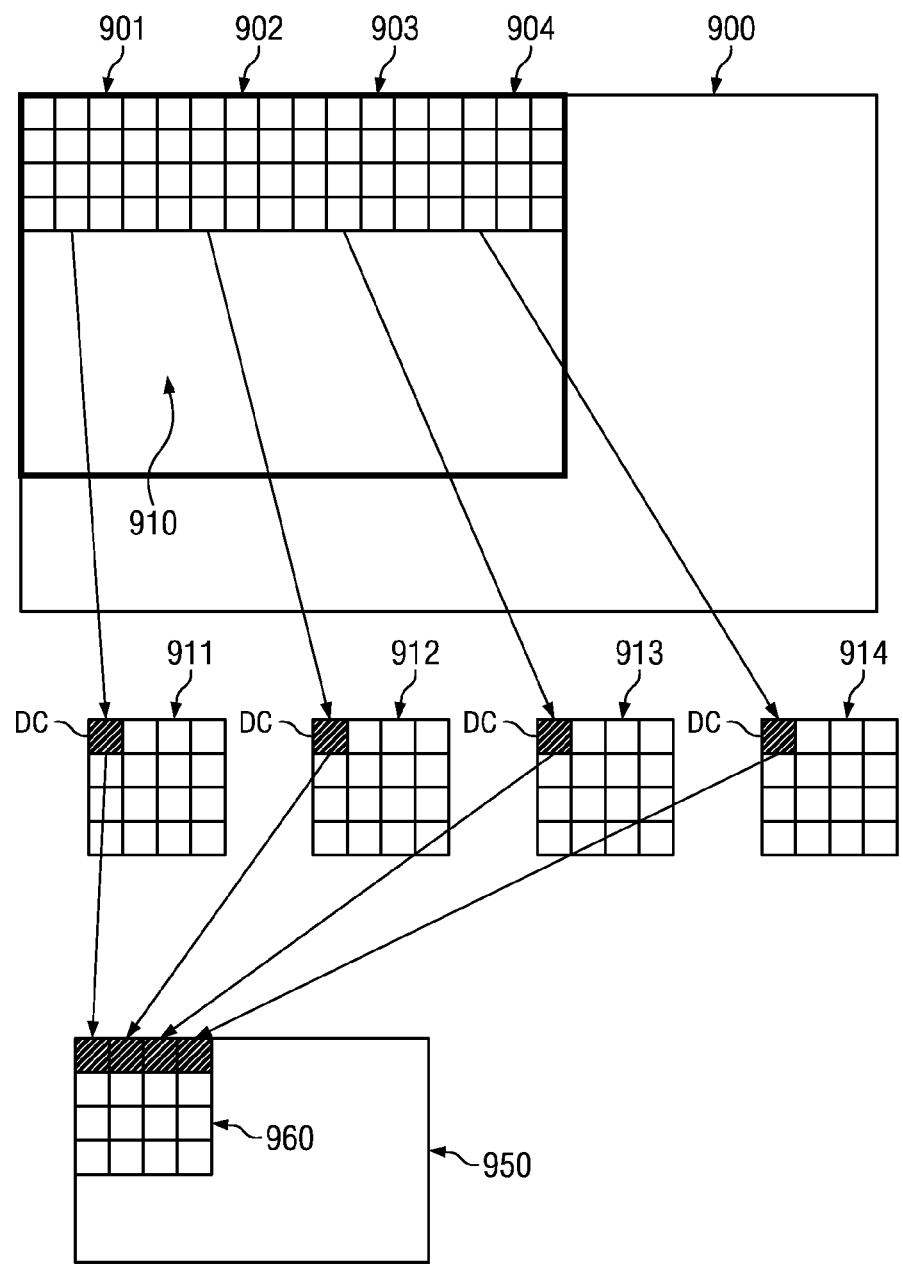
FIG. 9 is a diagram used to illustrate the operation of an adaptive quantization technique.

FIG. 9 (objects of FIG. 9 are not to scale) is used to illustrate the operations of the steps of the flow diagram of FIG. 8. In FIG. 9, the value of N is assumed to be four. Blocks 901, 902, 903 and 904 are four example 4×4 blocks in video frame 900, and are each contained in macro-block 910. Matrices 911, 912, 913 and 914 respectively represent the Hadamard transforms of blocks 901, 902, 903 and 904. The darkened squares at the top left of the matrices 911-914 respectively represent the DC component of the respective transforms. DC picture 950 is formed from only the DC coefficients of the transforms of all 4×4 blocks in video frame 900. DC picture 950 is thus 1/16 the size of video frame 910.

The first four pixels of the first row of DC picture 950 are shown in FIG. 9 as being formed by copying the DC values of the four respective transforms. Other pixels in DC picture 950 are formed from DC coefficients of Hadamard transforms of other corresponding 4×4 blocks of video frame 900, but are not shown in FIG. 9. It may be observed from FIG. 9 that each 4×4 block (such as block 960) in DC picture 950 will correspond to a 16×16 macro-block in video frame 900. Thus, for example, 4×4 block 960 corresponds to 16×16 macro-block 910.

A standard deviation of pixel values in each 4×4 block in DC picture 950 is then computed. SDmax and SDmin respectively represent the largest and the smallest of the standard deviations thus computed. A threshold TH2 is then computed according to the formula:

$$TH2 = (SDmax - SDmin) * CF1 + SDmin \quad \text{Equation 8}$$

wherein, CF1 is another control factor, is also empirically determined, and equals 0.18 in an embodiment.

If the standard deviation of pixel values in a 4×4 block in the DC picture is less than TH2, the macro-block corresponding to the 4×4 block in the DC picture is classified as a smooth macro-block. Thus, for example if the standard deviation of pixel values in 4×4 block 960 is less than TH2, then macro-block 910 is classified as a smooth macro-block.

However, if the standard deviation of pixel values in a 4×4 block in the DC picture is greater than equal to TH2, the corresponding macro-block is classified as an edge macro-block if all macro-blocks adjacent to the macro-block are determined to be smooth macro-blocks. If a macro-block is not classifiable as a smooth macro-block or an edge macro-block as described above, the macro-block is classified as a 'texture' macro-block.

Having thus classified a macro-block in a video frame as one of smooth, edge and texture macro-blocks, activity measurement block 210 provides such information to Qs modulator 250. Qs modulator 250 modulates baseQs received for a macro-block based on whether the macro-block is a smooth, edge or texture macro-block. In an embodiment, the modulation of baseQs is performed as described above with respect to equations 4, 5 and 6.

The modulation of quantization scales (also termed adaptive quantization) according to equations 4, 5 and 6 generate (respectively) only three 'discrete' quantization scales, based on the classification of the macro-block, and the corresponding adaptive quantization may be viewed as being discrete (as against the 'continuous' adaptive quantization in the techniques of FIGS. 3, 4 and 5 described above).

The modulation of baseQs (i.e., adaptive quantization) in the techniques described above may need to switched off whenever a 'scene change' occurs. A scene change is deemed to occur if there is a complete change between the scenes represented by two successive video frames. For example, a video camera might be focused and oriented in a fixed direction and be generating video frames representing a corresponding scene (which may contain local changes in detail from time to time). The orientation of the video camera may then be suddenly changed to a new direction. Video frames captured subsequent to the change (whether abrupt or slow) represent a 'different' scene, and a scene change may be said to occur between the two orientations of the video camera.

It is generally necessary to switch off adaptive modulation when a scene change occurs, since not doing so may result in significant adverse effect on the subjective video quality of future video frames. Such an adverse effect may occur when average activity measures of macro-blocks in a previous frame are used in the adaptive quantization for macro-blocks of a 'current' frame, as for example performed according to Equation 2 above. Detecting a scene change prior to encoding may not be computationally feasible due to resource and processing time constraints in video encoder 100. Hence, in an embodiment, scene change is checked for, and adaptive quantization is switched off for the video frame immediately on detection of scene change inside the 'first frame' of new scene.

In an embodiment, two techniques are employed to detect scene change. To detect scene change in inter-predicted frames (P and B type frames), after encoding of each macro-block in a current video frame (or picture in general), the number of intra-coded macro-blocks as a percentage of total number of macro-blocks already encoded in the current picture is computed by inter-frame prediction engine 120. If the percentage exceeds a predefined threshold, inter-frame prediction engine 120 concludes that that the current picture belongs to a new scene, and provides such information to adaptive quantizer 140. Adaptive quantizer 140 switches-off adaptive quantization for all yet-to-be-encoded macro-blocks in the picture.

To detect scene change in intra-predicted frames (I frames), after encoding of each macro-block in a current picture, intra-frame prediction engine 110 checks if the activity measures obtained for the macro-blocks thus far in the picture are very different from co-located macro-blocks in the previous frames. If the activity measures are deemed to be very different (for example, based on thresholds), intra-frame prediction engine 110 concludes that that the current picture belongs to a new scene, and provides such information to adaptive quantizer 140. Adaptive quantizer 140 switches-off adaptive quantization for all yet-to-be-encoded macro-blocks in the picture.

While inter-frame prediction engine 120 and intra-frame prediction engine 110 are noted above as making a determination of scene change, in other embodiments, other blocks of video encoder 100 may instead perform such determination. Further, an indication of that a scene change has occurred could be received by video encoder 100 as an external input as well.

Video encoder 100 may require to operate in real-time, and accordingly, one or more of the above techniques for adaptive quantization may be performed in a manner optimized to maximize the computational throughput of video encoder 100 in performing the corresponding operations. Thus, some of the operations may be performed in hardware accelerators (not shown) in video encoder 100 (thereby potentially enabling reuse of one or more of the hardware units for the same operation), while other operations may be performed by the execution of software instructions by a processor unit (such as CPU 1010 of FIG. 10). Further, the respective operations in the hardware accelerators and the processor unit may be performed in parallel at least to some degree to increase throughput.

As noted above, video encoder 100 (specifically mode decision block 115) may employ Lagrangian optimization methods to determine a mode to be used for encoding macro-blocks. In general, the optimization technique is designed to achieve optimum rate-distortion performance by selecting the best encoding modes and other parameters for a macro-block. Thus, video encoder 100 aims to minimize distortion in an encoded macro-block, under the constraint that the number of bits transmitted per unit time (the transmission bit-rate) does not exceed some desired value.

The optimization requirement is represented by the following equation:

$$J = D + \lambda R \qquad \text{Equation 9A}$$

wherein,

J is the Lagrange cost that is desired to be minimized,

D is the extent of distortion in a video frame due to encoding,

λ is the Lagrange multiplier, and

R is the transmission bit-rate.

Mode decision block 115 determines a mode for encoding a macro-block that minimizes J of equation 9.

In an embodiment, adaptive perceptual Lagrangian scaling, i.e., adaptively changing the value of Lagrange multiplier λ (of equation 9) to exploit different perceptual sensitivities of the HVS for different 'types' (e.g., smooth, edge and texture) of macro-blocks in a video frame is employed. As an illustration, the HVS is more sensitive to distortion of edge macro-blocks. Hence, in the embodiment, more weight is shifted to distortion D of equation 9 for such macro-blocks, i.e., the value of λ is adapted (decreased from what it would have been otherwise) such that Lagrange cost J is correspondingly changed, and a different mode decision may be taken by mode decision block 115.

Lagrange multiplier λ increases monotonically as the quantization scale (as well as the quantization parameter) increases. Mode decision block 115 may store a table containing quantization parameter values and the corresponding values of Lagrange multipliers. Lagrange multiplier λ is related to quantization scale Qs according to the following equation:

$$\lambda = c * Qs^2 \qquad \text{Equation 9B}$$

wherein c is a multiplication factor, and may be selected to have a desired vale for video encoder 100, ^ represent the 'to the power of' operator, and Qs represents the quantization scale.

Mode decision block 115 may thus, alternatively, use equation 9B to compute λ without using a table as noted above. In the embodiment, the modulated quantization scales (as obtained in equations 4, 5 and 6) are adapted (modified) to adapt λ. Adaptation of λ refers to changing a default value of λ which would otherwise be used to compute J. In an embodiment, the adaptation is performed as described below.

For macro-blocks determined to be smooth macro-blocks:

$$\lambda s = \lambda(qps) \qquad \text{Equation 10}$$

wherein,

λs is the value of the Lagrangian multiplier to be used in Equation 9, qps is the modulated quantization parameter for smooth macro-block, and is computed according to Equation 4, and λ(qps) is a mapping operation that provides λs corresponding to qps.

The table look-up to obtain as from qps may be performed by mode decision block 115 using an internally stored table containing a one-to-one mapping of Lagrange multiplier values and corresponding quantization scale values. It may be observed from Equation 10 that for smooth macro-blocks there is no modification or adaptation in the value of the Lagrange multiplier.

For macro-blocks determined to be edge macro-blocks:

$$\lambda e = \lambda(qpe - \delta e) \qquad \text{Equation 11}$$

wherein,

λe is the adapted value of the Lagrangian multiplier to be used in Equation 9, qpe is the modulated quantization parameter for edge macro-blocks, and is computed according to Equation 5, and λ(qpe−δe) is a mapping operation that provides λe corresponding to (qpe−δe).

The table look-up to obtain λs from qps may be performed by mode decision block 115 as noted above. It may be observed from equation 11, that for edge macro-blocks, the value of the Lagrangian multiplier is decreased (due to the subtraction of δe from qpe), thereby giving more weight to distortion D (equation 9). In contrast, if Langrange multiplier adaptation were not used, a value equal to λ(qpe) itself would have been used in determining J. As noted above, the HVS is more sensitive to distortion of edge macro-blocks. Hence, reduction of the Lagrange multiplier to give more weight to distortion D may enable mode decision block 115 to determine an encoding mode for the edge macro-block that reduces perceived distortion (at a viewing end, for example in a video decoder).

For macro-blocks determined to be texture macro-blocks:

$$\lambda t = \lambda(qpt + \delta t) \qquad \text{Equation 12}$$

wherein,

λt is the adapted value of the Lagrangian multiplier to be used in Equation 9, qpt is the modulated quantization parameter for texture macro-blocks, and is computed according to Equation 6, and λ(qpt+δt) is a mapping operation that provides λe corresponding to (qpe−δe).

The table look-up to obtain λs from qps may be performed by mode decision block 115 as noted above. It may be observed from equation 12, that for texture macro-blocks, the value of the Lagrangian multiplier is increased, thereby giving less weight to distortion D (equation 9). As noted above, the HVS is less sensitive to distortion (or noise) in texture macro-blocks. Hence, increase in the value of the Lagrange multiplier gives less weight to distortion D for texture macro-blocks, and may enable mode decision block 115 to determine an encoding mode for the texture macro-block that decreases the transmission bit rate (or frame rate) of video encoder 100.

The specific values of δe and δt may be determined empirically. Equations 10, 11 and 12 represent only one specific technique for modifying the Lagrange multiplier based on the class of the macro-block. Other embodiments may use other techniques to modify the Lagrange multiplier based on macro-block class.

Video encoder 100, designed to operate according to techniques described above, may be implemented using software, hardware, or a combination of hardware and software. In general, when throughput performance is of primary consideration, the implementation is done more in hardware (e.g., in the form of an application specific integrated circuit). When cost is of primary consideration, the implementation is performed more in software (e.g., using a processor executing instructions provided in software/firmware). Cost and performance can be balanced by employing a mix of hardware, software and/or firmware. Some of the implementation approaches noted above may be designed to incorporate at least some degree of parallelism or pipelining. For example, when the implementation is substantially in software, some of the time-critical and/or compute-intensive operations may be executed by dedicated hardware units, with the less time-critical and/or less compute-intensive operations being executed by software instructions. An example embodiment implemented substantially in software is described next.

2. Digital Processing System

Figure 10:
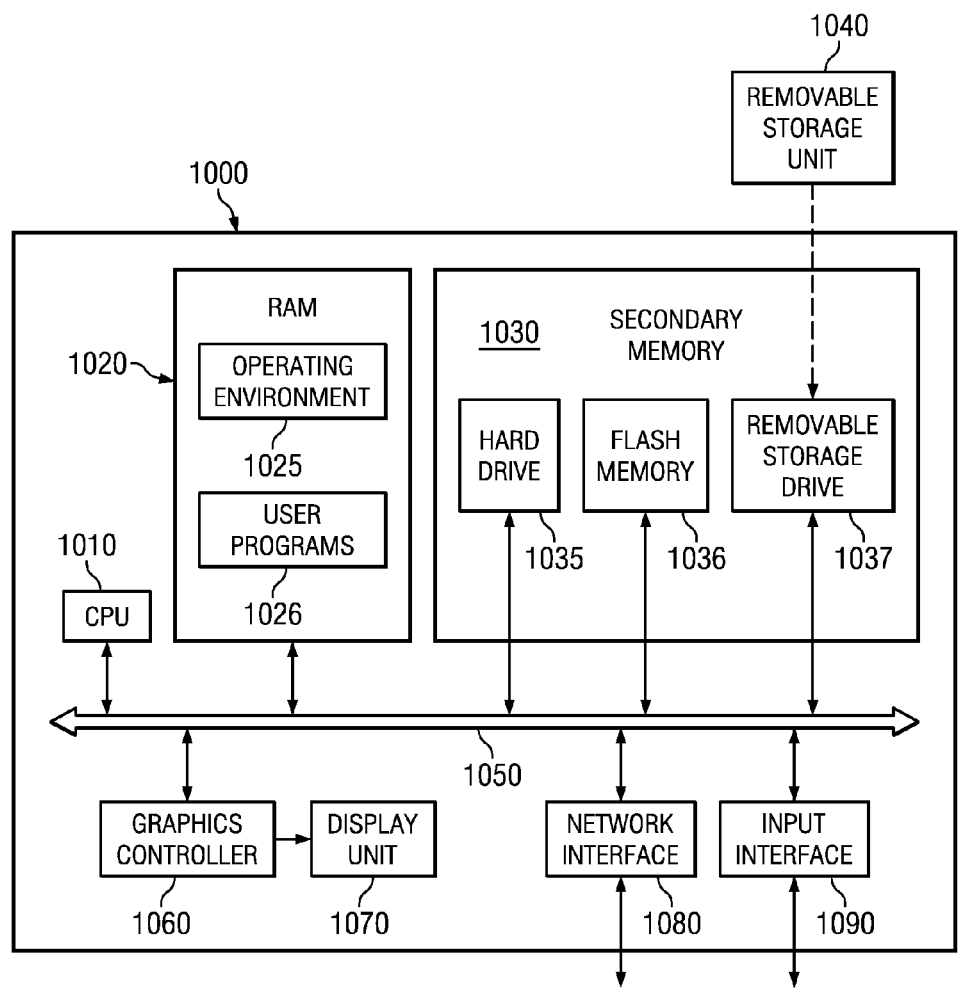
FIG. 10 is a block diagram illustrating the details of a digital processing system in which several embodiments can be implemented based on operation of software instructions.

FIG. 10 is a block diagram illustrating the details of a digital processing system (1000) in which several embodiments of video encoder 100 of FIG. 1 are operative by execution of appropriate execution modules.

Digital processing system 1000, which may be implemented as video encoder 100, may contain one or more processors such as a central processing unit (CPU) 1010, random access memory (RAM) 1020, secondary memory 1030, graphics controller 1060, display unit 1070, network interface 1080, and input interface 1090. All the components except display unit 1070 may communicate with each other over communication path 1050, which may contain several buses as is well known in the relevant arts.

CPU 1010 may execute instructions stored in RAM 1020 to provide adaptive quantization and Lagrange multiplier adaptation as described above. The instructions include those executed by the various blocks of FIG. 1. CPU 1010 may contain multiple processing units, with each processing unit potentially being designed for a specific task. Alternatively, CPU 1010 may contain only a single general-purpose processing unit.

RAM 1020 may receive instructions from secondary memory 1030 via communication path 1050. RAM 1020 is shown currently containing software instructions constituting operating environment 1025 and/or user programs 1026 (such as are executed by the blocks of FIG. 1). The operating environment contains utilities shared by user programs, and such shared utilities include operating system, device drivers, virtual machines, etc., which provide a (common) run time environment for execution of user programs/applications.

Graphics controller 1060 generates display signals (e.g., in RGB format) to display unit 1070 based on data/instructions received from CPU 1010. Display unit 1070 contains a display screen to display the images defined by the display signals. Input interface 1090 may correspond to a keyboard and a pointing device (e.g., touch-pad, mouse), and may be used to provide inputs. Network interface 1080 provides connectivity (by appropriate physical, electrical, and other protocol interfaces) to a network (not shown, but which may be electrically connected to path 199 of FIG. 1), and may be used to communicate with other systems connected to the network.

Secondary memory 1030 may contain hard drive 1035, flash memory 1036, and removable storage drive 1037. Secondary memory 1030 may store data and software instructions, which enable digital processing system 1000 to provide several features in accordance with the description provided above. The blocks/components of secondary memory 1030 constitute computer (or machine) readable media, and are means for providing software to digital processing system 1000. CPU 1010 may retrieve the software instructions, and execute the instructions to provide various features of the embodiments described above Some or all of the data and instructions may be provided on removable storage unit 1040, and the data and instructions may be read and provided by removable storage drive 1037 to CPU 1010. Floppy drive, magnetic tape drive, CD-ROM drive, DVD Drive, Flash memory, removable memory chip (PCMCIA Card, EPROM) are examples of such removable storage drive 1037.

Removable storage unit 1040 may be implemented using medium and storage format compatible with removable storage drive 1037 such that removable storage drive 1037 can read the data and instructions. Thus, removable storage unit 1040 includes a computer readable (storage) medium having stored therein computer software and/or data. However, the computer (or machine, in general) readable medium can be in other forms (e.g., non-removable, random access, etc.).

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A method of encoding a video frame, the method being implemented in a video encoder, the method comprising;
   receiving the video frame;
   performing a high-pass filtering operation on the video frame to obtain a filtered video frame;
   resetting to zero, a value of each pixel in the filtered video frame, if the value of the corresponding pixel in the filtered video frame is less than a first threshold value, wherein the resetting forms a thresholded video frame;
   classifying a macro-block of the thresholded video frame into one of multiples classes on the basis of an activity measure of the macro-block, wherein the classifying further comprises determining a factor maxAct and a factor minAct, wherein maxAct equals the largest number of non-zero pixel values of any macro-block among the macro-blocks in the video frame, and wherein minAct equals the smallest number of non-zero pixel values of any macro-block among the macro-blocks in the video frame, and computing a second threshold TH1, wherein TH1 is computed according to the formula: TH1=(maxAct−minAct)*CF+minAct, wherein CF is a control factor, wherein the classifying classifies the macro-block as a smooth macro-block if the number of non-zero pixel values in the macro-block is less than TH1; and
   modulating a quantization scale received for quantizing the macro-block on the basis of the class of the macro-block.

2. The method of claim 1, wherein the activity measure of the macro-block is determined based on a number of pixels with non-zero values in the macro-block.

3. The method of claim 1, wherein if the number of non-zero pixel values in the macro-block is greater than TH1 and if the classifying has classified all macro-blocks adjacent to the macro-block as smooth macro-blocks, the classifying classifies the macro-block as an edge macro-block and as a texture macro-block otherwise.

4. A method of encoding a video frame, the method being implemented in a video encoder, the method comprising;
   receiving the video frame;
   computing a transform for each of a plurality of N×N blocks in the video frame;
   forming a DC picture containing only DC coefficients of the transforms obtained by the computing, wherein there exists a one-to-one correspondence between each N×N block in the DC picture and a macro-block in the video frame;
   classifying, into one of multiples classes, macro-blocks in the video frame on the basis of a standard deviation of pixel values of corresponding N×N blocks in the DC picture, wherein the classifying further comprises determining a factor maxAct and a factor minAct, wherein maxAct equals the largest number of non-zero pixel values of any macro-block among the macro-blocks in the video frame, and wherein minAct equals the smallest number of non-zero pixel values of any macro-block among the macro-blocks in the video frame, and computing a second threshold TH1, wherein TH1 is computed according to the formula: TH1=(maxAct−minAct)*CF+minAct, wherein CF is a control factor, wherein the classifying classifies the macro-block as a smooth macro-block if the number of non-zero pixel values in the macro-block is less than TH1; and modulating a quantization scale received for quantizing the macro-block on the basis of the class of the macro-block.

5. The method of claim 4, wherein if the standard deviation of the corresponding N×N block is greater than TH2 and if the classifying has classified all macro-blocks adjacent to a second macro-block as smooth macro-blocks, the classifying classifies the second macro-block as an edge macro-block, and as a texture macro-block otherwise.

6. The method of claim 5, wherein the modulating comprises:

multiplying the quantization scale received for quantizing the macro-block by a first scaling factor if the classifying classifies the macro-block as a smooth macro-block, multiplying the quantization scale received for quantizing the macro-block by a second scaling factor if the classifying classifies the macro-block as an edge macro-block, and multiplying the quantization scale received for quantizing the macro-block by a third scaling factor if the classifying classifies the macro-block as a texture macro-block.

7. A method of encoding a video frame, the method being implemented in a video encoder, the method comprising:

receiving the video frame;

classifying a macro-block in the video frame into one of a plurality of classes wherein, if the classifying classifies the macro-block as an edge macro-block, the value of $\lambda ad$ is computed as:

$$\lambda ad=\lambda(qpe-\delta e),$$

wherein, $\lambda ad$ is the adapted value of the Lagrangian multiplier to be used to minimize J if the macro-block is an edge macro-block, qpe is the modulated quantization parameter for an edge macro-block, and $\delta e$ is a constant, wherein, if the classifying classifies the macro-block as a texture macro-block, the value of $\lambda ad$ is computed as:

$$\lambda ad=\lambda(qpt+\delta t),$$

wherein, $\lambda ad$ is the adapted value of the Lagrangian multiplier to be used to minimize J if the macro-block is a texture macro-block, qpt is the modulated quantization parameter for a texture macro-block, and $\delta t$ is a constant, and wherein, if the classifying classifies the macro-block as a smooth macro-block, the value of $\lambda ad$ is computed as:

$$\lambda ad=\lambda(gps)$$

wherein, $\lambda ad$ is the adapted value of the Lagrangian multiplier to be used to minimize J if the macro-block is a smooth macro-block, and qps is the modulated quantization parameter for a smooth macro-block;

modulating a quantization scale received for quantizing the macro-block on the basis of the class of the macro-block to generate a modulated quantization scale, the class of the macro-block being determined by the classifying; and determining an encoding mode for the macro-block on the basis of the class.

8. The method of claim 7, wherein the determining comprises:

computing an adapted value $\lambda ad$ of a Lagrange multiplier based on the value of the modulated quantization scale, wherein there exists a one-to-one correspondence between $\lambda ad$ and the modulated quantization scale;

minimizing a Lagrange cost for encoding the macro-block, wherein the Lagrange cost is computed according to the following equation:

$$J=D+\lambda ad*R,$$

wherein,

J is the Lagrange cost,

D represents a distortion in the macro-block due to the encoding, $\lambda ad$ is the adapted Lagrange multiplier, and R is the transmission bit-rate, wherein the determining determines the encoding mode as a mode that corresponds to the minimized Lagrange cost J.

* * * * *